US009862631B2

(12) United States Patent
Min et al.

(10) Patent No.: US 9,862,631 B2
(45) Date of Patent: Jan. 9, 2018

(54) APPARATUS FOR ELIMINATING HETEROGENEOUS GLASS AND GLASS MANUFACTURING APPARATUS COMPRISING THE SAME

(71) Applicant: LG CHEM, LTD., Seoul (KR)

(72) Inventors: Kyoung-Hoon Min, Daejeon (KR); Ye-Hoon Im, Daejeon (KR); Won-Jae Moon, Daejeon (KR); Ji-Seob Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/426,909

(22) PCT Filed: Sep. 3, 2014

(86) PCT No.: PCT/KR2014/008266
§ 371 (c)(1),
(2) Date: Mar. 9, 2015

(87) PCT Pub. No.: WO2015/034259
PCT Pub. Date: Mar. 12, 2015

(65) Prior Publication Data
US 2016/0023937 A1    Jan. 28, 2016

(30) Foreign Application Priority Data
Sep. 3, 2013    (KR) .................. 10-2013-0105602

(51) Int. Cl.
*C03B 5/18* (2006.01)
*C03B 5/24* (2006.01)
(Continued)

(52) U.S. Cl.
CPC .................. *C03B 5/18* (2013.01); *C03B 5/20* (2013.01); *C03B 5/245* (2013.01); *C03B 5/262* (2013.01);
(Continued)

(58) Field of Classification Search
CPC ........... C03B 5/265; C03B 5/262; C03B 5/26; C03B 5/205; C03B 5/245; C03B 5/24
See application file for complete search history.

(56) References Cited

U.S. PATENT DOCUMENTS

| 1,538,229 A | * | 5/1925 | Weaver | ................... C03B 5/262 |
| | | | | 65/134.1 |
| 1,751,045 A | * | 3/1930 | Mambourg | ............. C03B 5/205 |
| | | | | 65/197 |

(Continued)

FOREIGN PATENT DOCUMENTS

| CN | 1093062 A | 10/1994 |
| CN | 101506110 A | 8/2009 |

(Continued)

OTHER PUBLICATIONS

KR20130080782—English Language Machine Translation—obtained Apr. 3, 2016 at ESP@CENET.*

*Primary Examiner* — Jason L Lazorcik
(74) *Attorney, Agent, or Firm* — Dentons US LLP

(57) ABSTRACT

The present disclosure provides an apparatus for eliminating a heterogeneous glass present in the top surface of a molten glass effectively, and a melting furnace and a glass manufacturing apparatus comprising the same. The apparatus for eliminating a heterogeneous glass according to one aspect of the present disclosure comprises a storage bath having an inlet and an outlet to receive a molten glass fed into the inlet and to discharge the received molten glass through the outlet, and an evacuating opening formed on the top of the storage bath, the evacuating opening allowing the received molten glass to overflow; a first gate being mounted close to the outlet of the storage bath to adjust an open area, thereby controlling the flow rate of the molten glass to be discharged through the outlet; and a second gate being mounted close to the inlet of the storage bath to control the height of the (Continued)

molten glass received in the storage bath at the section in which the evacuating opening is formed.

6 Claims, 1 Drawing Sheet

(51) Int. Cl.
    *C03B 5/26*     (2006.01)
    *C03B 5/20*     (2006.01)

(52) U.S. Cl.
    CPC .............. *C03B 5/265* (2013.01); *C03B 5/267* (2013.01); *Y02P 40/57* (2015.11)

(56) References Cited

U.S. PATENT DOCUMENTS

| | | | | |
|---|---|---|---|---|
| 1,872,477 A | * | 8/1932 | Mambourg | C03B 5/205 65/135.1 |
| 1,909,152 A | * | 5/1933 | Peiler | C03B 7/02 65/326 |
| 1,927,658 A | * | 9/1933 | Geer | C03B 5/187 65/178 |
| 2,122,469 A | * | 7/1938 | Hitner | C03B 5/03 373/33 |
| 2,597,585 A | * | 5/1952 | Howard | C03B 3/02 432/13 |
| 2,999,511 A | * | 9/1961 | Chew, Sr. | C03B 5/245 137/392 |
| 3,053,012 A | * | 9/1962 | Chew, Sr. | C03B 5/245 137/392 |
| 3,321,288 A | * | 5/1967 | Griem, Jr. | C03B 5/24 65/129 |
| 3,630,708 A | * | 12/1971 | Ihrig | C03B 5/262 65/135.1 |
| 3,666,432 A | * | 5/1972 | Kunkle et al. | C03B 5/205 65/27 |
| 3,915,682 A | * | 10/1975 | Chotin | C03B 5/24 65/128 |
| 3,928,010 A | | 12/1975 | Cramer | |
| 4,744,809 A | | 5/1988 | Pecoraro et al. | |
| 4,948,411 A | * | 8/1990 | Pieper | B09B 3/005 65/337 |
| 5,433,765 A | * | 7/1995 | Muniz | C03B 5/187 65/135.1 |
| 5,613,994 A | | 3/1997 | Muniz et al. | |
| 2009/0165501 A1 | | 7/2009 | Sasaki et al. | |
| 2010/0229601 A1 | * | 9/2010 | Kishimoto | C03B 5/262 65/90 |

FOREIGN PATENT DOCUMENTS

| | | |
|---|---|---|
| JP | S46-9149 B1 | 3/1971 |
| JP | S5351451 U | 5/1978 |
| JP | S53145827 A | 12/1978 |
| JP | 10-29927 A | 11/1998 |
| JP | 2005527450 A | 9/2005 |
| KR | 10-2012-0057662 A | 6/2012 |
| KR | 10-2013-0080782 A | 7/2013 |
| PL | 68352 B1 | 2/1973 |

* cited by examiner

APPARATUS FOR ELIMINATING HETEROGENEOUS GLASS AND GLASS MANUFACTURING APPARATUS COMPRISING THE SAME

This application is a National Stage Entry of International Application No. PCT/KR2014/008266, filed Sep. 3, 2014, and claims the benefit of Korean Application No. 10-2013-0105602 filed on Sep. 3, 2013, all of which are hereby incorporated by reference in their entirety for all purposes as if fully set forth herein.

TECHNICAL FIELD

The present disclosure relates to a glass manufacturing technique, and more particularly to a technique that can eliminate a heterogeneous glass present in the top surface of a molten glass effectively and stably when the molten glass is supplied from a melting furnace to a molding furnace.

BACKGROUND ART

There are various forms of glasses. Among these, flat glasses are representative and have been used in various fields such as a window glass, an automobile window screen, a mirror, and the like. A flat glass may be manufactured by various techniques.

Representatively, steps of melting, agitating, stabilizing, molding and slow cooling are applied in the manufacturing of glasses.

Among these, the melting step is to melt (fuse) raw materials of glass to produce molten glass, and may be conducted in a melting furnace made of fire bricks. Such a melting furnace conventionally needs a burner so as to control the temperature of the molten glass during the melting step, and the use of the burner may generate much gas in the upper portion of the molten glass (glass melt). The gas brings into contact with the top surface of the molten glass, and some components of the glass being in reaction with the gas or having strong volatility evaporate from the top surface of the molten glass, thereby altering the characteristic of the glass or forming a heterogeneous glass comprising foreign materials.

If such a heterogeneous glass present in the surface of the molten glass is introduced in a molding process, a glass product to be finally obtained may be deteriorated in its quality. Therefore, it is necessary to completely eliminate the heterogeneous glass present in the surface of the molten glass.

As a conventional method for eliminating such a heterogeneous glass, a technique of forming an overflow zone in a melting furnace has been representatively used. In the overflow zone, a molten glass is made to overflow, thereby eliminating a heterogeneous glass present in the surface of the molten glass.

However, this technique has the problem that an overflow rate may vary depending on the height of the molten glass. For example, when operation conditions or glass properties are changed in processes prior to the overflow zone step, the overflow rate in the overflow zone may exceed or be less than the optimum rate. If the overflow rate exceeds the optimum rate in the overflow zone, a normal glass being molten as well as a heterogeneous glass may be excessively eliminated to increase glass manufacturing cost and time. On the contrary, if the overflow rate is less than the optimum rate, the elimination of the heterogeneous glass is insufficient and the quality and yield of a glass product to be obtained may be seriously deteriorated.

DISCLOSURE

Technical Problem

The present disclosure is designed to solve the above problem, and therefore, the present disclosure is directed to providing an apparatus for eliminating a heterogeneous glass present in the top surface of a molten glass effectively, and a melting furnace and a glass manufacturing apparatus comprising the same.

These and other objects and aspects of the present disclosure can be understood by the following description, and will become apparent from the embodiments of the present disclosure. Also, it should be understood that these and other objects and aspects of the present disclosure may be achieved by any means in the scope of the disclosure and combinations thereof.

Technical Solution

To achieve the above objects, the present disclosure provides an apparatus for eliminating a heterogeneous glass, comprising a storage bath having an inlet and an outlet to receive a molten glass fed into the inlet and to discharge the received molten glass through the outlet, and an evacuating opening formed on the top of the storage bath, the evacuating opening allowing the received molten glass to overflow; a first gate being mounted close to the outlet of the storage bath to adjust an open area, thereby controlling the flow rate of the molten glass to be discharged through the outlet; and a second gate being mounted close to the inlet of the storage bath to control the height of the molten glass received in the storage bath at the section in which the evacuating opening is formed.

Preferably, the second gate constantly maintains the height of the molten glass received in the storage bath at the section in which the evacuating opening is formed.

Also, it is preferred that the heterogeneous glass-eliminating apparatus of the present disclosure further comprises a unit for measuring the height of the molten glass received in the storage bath at the section in which the evacuating opening is formed.

Preferably, the second gate is configured to move up and down, and increases the open area when it moves upwardly from the bottom.

Also, the second gate is preferably configured such that a horizontal distance between the second gate and the evacuating opening is not less than the double length of the depth of the second gate inserted in the molten glass at the side in which the evacuating opening is positioned.

In addition, the second gate is preferably configured such that the depth of the second gate inserted in the molten glass at the side in which the evacuating opening is positioned ranges from 10 to 50% of the depth of the molten glass received in the storage bath at the section in which the evacuating opening is formed.

Also, the second gate is preferably configured to have rounded bottom corners.

In addition, the second gate is preferably made of a refractory material.

In addition, the second gate is preferably coated with platinum on at least a part of the surface thereof.

Further, the present disclosure provides a melting furnace, comprising the above-mentioned apparatus for eliminating a heterogeneous glass.

Furthermore, the present disclosure provides a glass manufacturing apparatus, comprising the above-mentioned apparatus for eliminating a heterogeneous glass.

Advantageous Effects

According to the present disclosure, a heterogeneous glass being present in the top surface of a molten glass obtained in a melting furnace can be effectively eliminated.

Particularly, according to one aspect of the present disclosure, the height of an overflow zone in which the molten glass is made to overflow can be constantly maintained.

That is, even if there are factors that may change the height of an overflow zone, for example, may vary the operation conditions of a melting furnace or the properties of a glass, the height of the overflow zone can be constantly maintained. Therefore, according to the present disclosure, the overflow rate of the molten glass can be constantly maintained, and eventually a heterogeneous glass present in the top surface of the molten glass can be stably eliminated.

Thus, the present disclosure allows the effective and stable elimination of a heterogeneous glass in a molten glass to be introduced into a molding furnace and the like, thereby providing high quality of glasses and enhancing the production yield of the glasses.

DESCRIPTION OF DRAWINGS

The accompanying drawing illustrates a preferred embodiment of the present disclosure and together with the foregoing disclosure, serves to provide further understanding of the technical spirit of the present disclosure. However, the present disclosure is not construed as being limited to the drawing.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
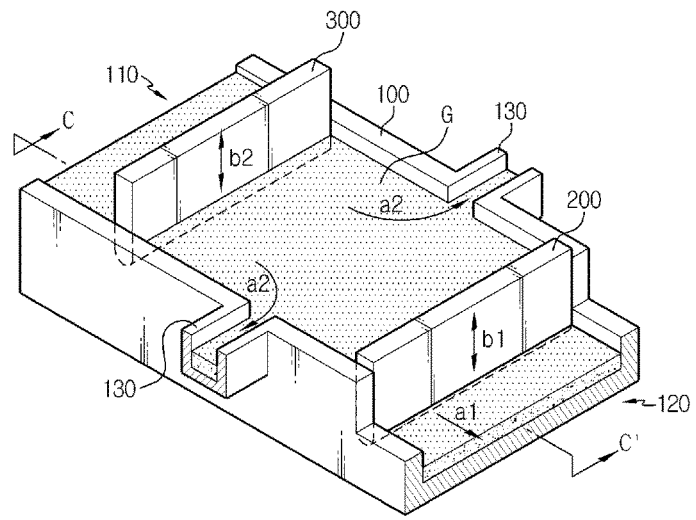
FIG. 1 is a perspective view schematically showing the configuration of a heterogeneous glass-eliminating apparatus according to one embodiment of the present disclosure.

FIG. 1 is a perspective view schematically showing the configuration of a heterogeneous glass-eliminating apparatus according to one embodiment of the present disclosure.

Referring to FIG. 1, the apparatus for eliminating a heterogeneous glass according to the present disclosure comprises a storage bath 100, a first gate 200, and a second gate 300.

The storage bath 100 has a space capable of receiving a liquid, in which a high temperature molten glass is received. Also, the storage bath 100 has an inlet 110 and an outlet 120 formed therein, the inlet 110 allows the molten glass to be fed therethrough into a receiving space, and the outlet 120 allows the received molten glass in the receiving space to be discharged therethrough.

Meanwhile, since the storage bath 100 should receive a high temperature molten glass, it may be made of a refractory material such as a firebrick.

The storage bath 100, which is a component of a melting furnace that melts the raw materials of a glass to produce a molten glass, is included within the melting furnace or is positioned in the rear end of the melting furnace to supply the molten glass into a molding furnace such as a float bath.

Particularly, the storage bath 100 may have an overflow zone that allows a part of the molten glass received to overflow. For this, the storage bath 100 may have one or more evacuating openings 130 on the top thereof. For example, as shown in FIG. 1, two evacuating openings 130 are provided on the top of the storage bath 100, and the molten glass in the top surface is made to overflow and is discharged, as indicated by the arrow a2. The molten glass may have a heterogeneous glass on the top surface thereof, and the heterogeneous glass may be made to overflow through the evacuating opening 130, thereby being removed from the storage bath 100.

The first gate 200 is configured to be mounted close to the outlet of the storage bath 100 so that it can open and close. Particularly, the first gate 200 can adjust an open area to control the flow rate of the molten glass to be discharged through the outlet 120 of the storage bath 100.

Particularly, the first gate 200 may be configured to move up and down, as indicated by b1 in FIG. 1. The first gate 200 can adjust a distance between the lower end thereof and the bottom of the storage bath 100, thereby controlling the flow rate of the molten glass to be discharged in the direction of a1 through the outlet 120. For example, when the first gate 200 moves upwardly, the flow rate of the molten glass being discharged through the outlet 120 may be raised, and when the first gate 200 moves downwardly, the flow rate of the molten glass being discharged through the outlet 120 may be lowered.

Preferably, the first gate 200 can adjust an open area by measuring the flow rate of the molten glass being discharged through the outlet 120. For example, when the flow rate of the molten glass being discharged through the outlet 120 is higher than the reference rate, the open area may increase, and when the flow rate of the molten glass being discharged through the outlet 120 is less than the reference rate, the open area may decrease.

The second gate 300 may be mounted close to the inlet 110 of the storage bath 100 with the evacuating opening 130 as the center. That is, as shown in FIG. 1, the second gate 300 is provided in the left of the evacuating opening 130. Therefore, the apparatus for eliminating a heterogeneous glass according to the present disclosure have the first gate 200 and the second gate 300 on both sides of the evacuating opening 130. Shortly, in the apparatus for eliminating a heterogeneous glass according to the present disclosure, since the evacuating opening 130 is positioned between the first gate 200 and the second gate 300, the overflow zone may be the section positioned between the first gate 200 and the second gate 300.

The second gate 300 may be configured to open and close, similar to the first gate 200. Particularly, the second gate 300 can adjust an open area, thereby controlling the height of the molten glass received in the storage bath 100 at the position in which the evacuating opening 130 is formed.

The configuration for controlling the height of the second gate 300 will be described below with reference to FIG. 2.

Figure 2:
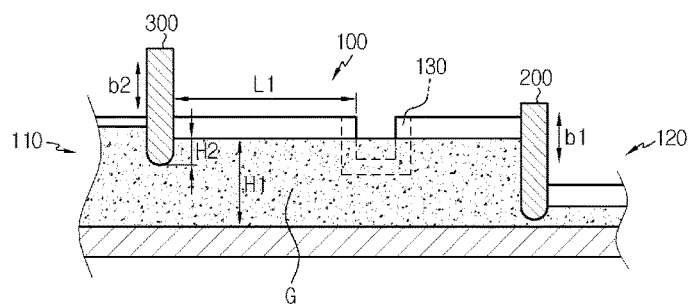
FIG. 2 is a cross-sectional view being taken along to the C-C' line of FIG. 1.

FIG. 2 is a cross-sectional view being taken along to the C-C' line of FIG. 1.

Referring to FIG. 2, the second gate 300 may be configured to move up and down, as indicated by the arrow b2. The up-and-down movement of the second gate 300 can change an open area being provided by the second gate 300 and can change the flow rate of the molten glass fed through the second gate 300. Thus, when the flow rate of the molten glass fed through the second gate 300 is changed, the height of the section in which the evacuating opening 130 is formed can be changed.

For example, referring to FIG. 2, H1 represents the height (depth) of the molten glass at the section in which the evacuating opening 130 is formed, i.e., the overflow zone, and H1 may relatively be raised when the open area increases by the upward movement of the second gate 300. On the other hand, H1 may relatively be lowered when the open area decreases by the downward movement of the second gate 300. Thus, in the apparatus for eliminating a heterogeneous glass according to the present disclosure, the height of the molten glass received in the storage bath 100 can be controlled through the second gate 300.

Preferably, the second gate 300 is preferably configured to constantly maintain the height of the molten glass received in the storage bath 100 at the section in which the evacuating opening 130 is formed. That is, the second gate 300 can adjust an open area so that H1 shown in FIG. 2 can be constantly maintained. In the present disclosure, the constant maintenance of the molten glass height means that the height of the molten glass is maintained into a constant value or within a constant range.

According to such an embodiment, even though the operation conditions of the melting furnace or the properties of the glass are changed, the height of the molten glass at the section in which the evacuating opening 130 is formed can be constantly maintained, and therefore, the overflow rate through the evacuating opening 130 can be constantly maintained. Thereby, a heterogeneous glass present in the top surface of the molten glass can be effectively eliminated, making it prevent the problem that the heterogeneous glass is insufficiently eliminated or the normal glass is excessively eliminated.

Preferably, the apparatus for eliminating a heterogeneous glass according to the present disclosure further comprises a height-measuring unit.

The height-measuring unit measures the height of the molten glass received in the storage bath 100 at the section in which the evacuating opening 130 is formed. For example, the height-measuring unit can measure the distance of H1 in FIG. 2. Thus, the height is measured by the height-measuring unit, the information of the height measurement is transferred into the second gate 300 to be used for controlling the operation of the second gate 300. For example, when the height (H1) measured by the height-measuring unit is less than the reference height, the second gate 300 moves upwardly to increase an open area, thereby raising the height of the molten glass received in the storage bath 100 at the section in which the evacuating opening 130 is formed.

Preferably, the second gate is configured such that a horizontal distance between the second gate 300 and the evacuating opening 130 is more than the double length of the depth of the second gate 300 inserted in the molten glass at the side in which the evacuating opening is positioned.

For example, in FIG. 2, when L1 represents the distance between the second gate 300 and the evacuating opening 130, and H2 represents the depth of the second gate 300 inserted in the molten glass, the L1 and H2 preferably satisfy the following relation.

$$L1 > 2H2$$

By such relation, the sufficient length can be obtained so that a heterogeneous glass present in the surface of the front side (the left of FIG. 2) of the second gate 300 is enough to be raised into the surface again after passing through the second gate 300. Therefore, it is possible to prevent the problem that the heterogeneous glass is not raised to the surface and not made to overflow into the evacuating opening 130 while the heterogeneous glass present in the front side of the second gate 300 passes through the second gate 300, and then moves into the direction (the right of FIG. 2) of the section in which the evacuating opening 130 is formed.

Also, the second gate 300 is preferably configured such that the depth of the second gate 300 inserted in the molten glass at the side in which the evacuating opening 130 is positioned ranges from 10 to 50% of the depth of the molten glass received in the storage bath 100 at the section in which the evacuating opening 130 is formed.

For example, in FIG. 2, when H2 represents the depth of the second gate 300 inserted in the molten glass at the side in which the evacuating opening 130 is positioned, and H1 represents the depth of the molten glass received in the storage bath 100 at the section in which the evacuating opening 130 is formed, the H1 and H2 preferably satisfy the following relation.

$$0.1 \leq H2/H1 \leq 0.5$$

By such relation, the flow rate of the molten glass that passes through the second gate 300 can be lowered below a certain level to minimize the formation of vortex and to make a heterogeneous glass be raised into the surface of the molten glass again after passing through the second gate 300, from which the heterogeneous glass is surely made to overflow and be eliminated.

Also, the second gate 300 is preferably configured to have rounded bottom corners.

Figure 3:
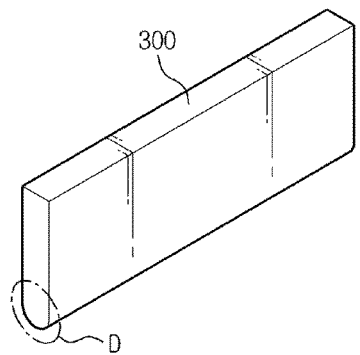
FIG. 3 is a perspective view schematically showing the configuration of a second gate according to one embodiment of the present disclosure.

FIG. 3 is a perspective view schematically showing the configuration of a second gate 300 according to one embodiment of the present disclosure.

Referring to FIG. 3, the second gate 300 is configured in the form of a plate whose bottom corner may be rounded in the form of a curved surface form. That is, as shown by D in FIG. 3, when seeing the second gate 300 at the front, its bottom form may be a rounded semicircle. According to such a configuration, the molten glass can pass through the second gate 300 smoothly, and the formation of vortex can be minimized.

However, the present invention is not limited to such a configuration, and the second gate 300 may be variously configured.

Also, the second gate 300 is preferably made of a refractory material. Since the second gate 300 comes into contact with a high temperature molten glass, it is favorable to be made of a refractory material being endurable to high temperature conditions.

In addition, the second gate 300 is preferably coated with a material being not brought into reaction with a high temperature molten glass on at least a part of the surface thereof. For example, the surface of the second gate 300 may be coated with platinum being chemically stable to a high temperature molten glass.

The apparatus for eliminating a heterogeneous glass according to the present disclosure can be applied in a glass melting furnace that melts glass raw materials and supplies the molten glass into a molding furnace such as a float bath. That is, the glass melting furnace of the present disclosure may comprise the above-mentioned apparatus for eliminating a heterogeneous glass. In this melting furnace, a bath receiving a molten glass may act as the storage bath 100 of the above-mentioned apparatus for eliminating a heterogeneous glass.

Further, the present disclosure provides a glass manufacturing apparatus, comprising the above-mentioned apparatus for eliminating a heterogeneous glass. Particularly, the glass manufacturing apparatus of the present disclosure may comprise the above-mentioned apparatus for eliminating a heterogeneous glass in a melting furnace. Besides, the glass manufacturing apparatus of the present disclosure may comprise a molding furnace and a slow cooling chamber.

Hereinabove, the present disclosure has been described by the limited embodiments and drawings, but is not limited thereto, and it should be understood that various changes and modifications may be made by those skilled in the art within the spirit of the disclosure and the equivalent scope of the appended claims.

What is claimed is:

1. An apparatus for eliminating a heterogeneous glass, comprising:
    a storage bath having an inlet to receive a molten glass fed into the inlet and an outlet to discharge the received molten glass through the outlet, and an evacuating opening formed on a top of the storage bath, the evacuating opening located in a section between a first gate and a second gate, the evacuating opening positioned below the top surface of the molten glass maintained between the first gate and the second gate and configured to allow the received molten glass to overflow and eliminate heterogeneous glass on the top surface thereof;
    the first gate being mounted on an outlet side of the section and configured to move up and down so that the gate can open and close so that a distance between a lower end of the first gate and a bottom of the storage bath can be adjusted to thereby control the flow rate of the molten glass to be discharged through the outlet;
    the second gate being mounted on an inlet side of the section, the second gate having a bottom that can be inserted in the molten glass, and the second gate having rounded bottom corners, the second gate being configured to move up and down so that the gate can open and close so that the height of the molten glass received in the storage bath can be controlled in the section where the evacuating opening is located, the second gate configured to maintain the height of the molten glass received in the storage bath in the section where the evacuating opening is located between the first gate and second gate at a constant value or within a constant range whereby an overflow rate through the evacuating opening can be constantly maintained thereby eliminating the heterogenous glass even if operation conditions of a melting furnace producing the molten glass or properties of the molten glass are changed; and
    a height-measuring unit for measuring the height of the molten glass received in the storage bath at the section in which the evacuating opening is formed, the height-measuring unit transferring an information of the height measurement to the second gate,
    wherein the second gate is controlled to operate using the information transferred by the height-measuring unit and configured to move upwardly or downwardly such that the double length of the depth of the second gate inserted in the molten glass at the side in which the evacuating opening is positioned is less than a horizontal distance between the second gate and the evacuating opening.

2. The apparatus for eliminating a heterogeneous glass according to claim 1, wherein the second gate is configured to increase an open area when it moves upwardly from the bottom.

3. The apparatus for eliminating a heterogeneous glass according to claim 1, wherein the second gate is made of a refractory material.

4. The apparatus for eliminating a heterogeneous glass according to claim 1, wherein the second gate is surface-coated with platinum.

5. A glass melting furnace, comprising the apparatus for eliminating a heterogeneous glass according to claim 1.

6. A glass manufacturing apparatus, comprising the apparatus for eliminating a heterogeneous glass according claim 1.

* * * * *